Patented Feb. 7, 1939

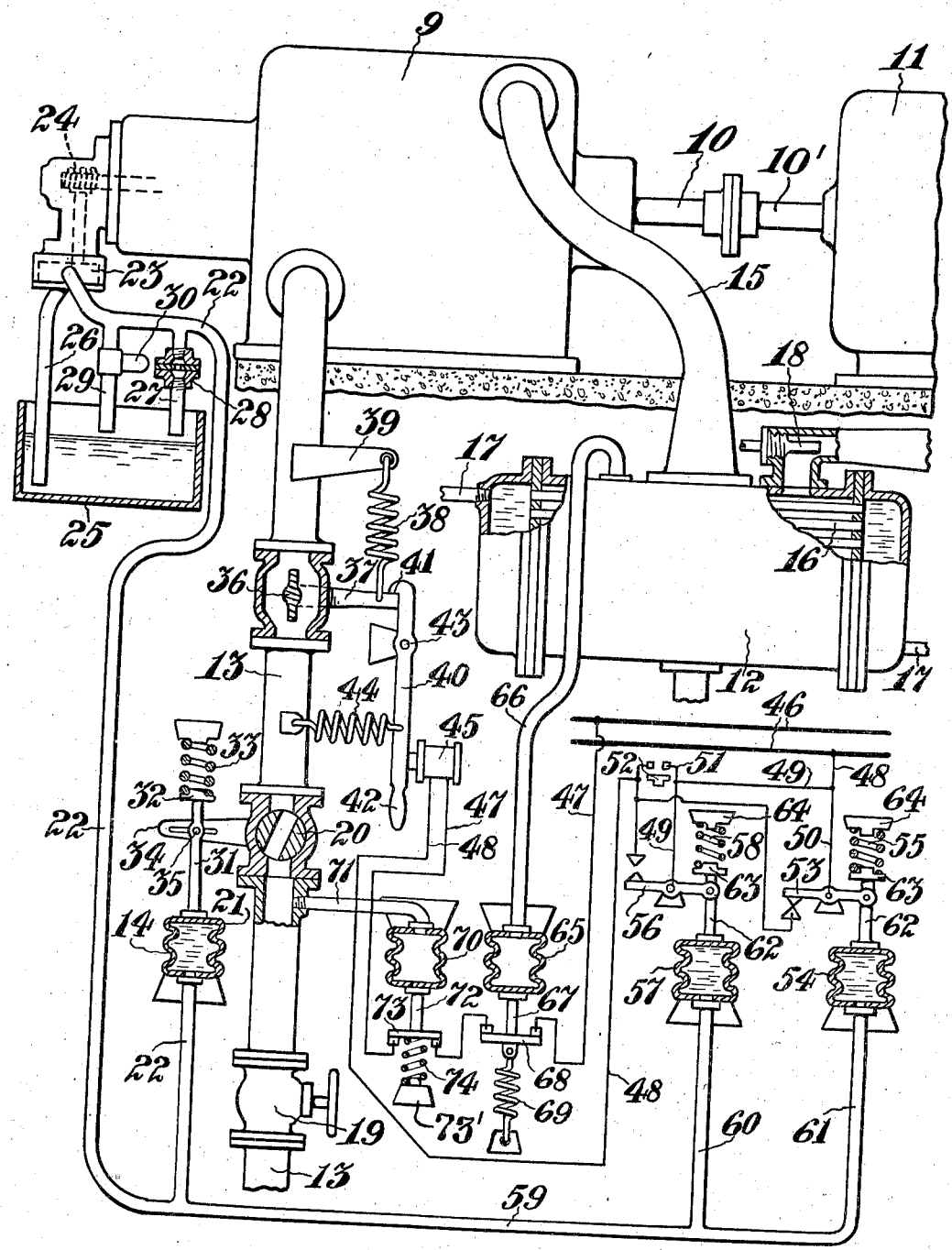

2,146,278

UNITED STATES PATENT OFFICE 2,146,278

PROTECTIVE APPARATUS FOR ROTARY MACHINES

George H. Woodard, Springfield, Pa., assignor to Ingersoll-Rand Company, Jersey City, N. J., a corporation of New Jersey Application April 12, 1937, Serial No. 136,403

14 Claims. (Cl. 137—158)

This invention relates to rotary machines, and more particularly to protective apparatus for machines of this type.

A rotary machine consists of a driving means and a driven means, or shaft, directly connected to the driving means. In the operation of such a machine it is very important that the speed of the machine is kept out of the critical speed range of the driven means. The critical speed of a rotor, or shaft, depends on the characteristic of the particular rotor itself. The weight of a horizontal shaft will deflect the shaft itself to a certain degree and it is therefore never possible to have the center of mass of the shaft at the center line of the shaft. Consequently, when the speed of the shaft is accelerated, the eccentricity of the mass increases the centrifugal force tending to deflect the shaft. When the rotative speed of the shaft increases the centrifugal force of the mass to an amount sufficient to balance the elasticity of the shaft, which normally opposes deflection of the shaft, the shaft is free to deflect further. This increases the wear on the glands, seals and other parts and in many instances causes total failure of the shaft. It is therefore necessary, in order to overcome this difficulty, that the machine should be run at speeds less than or greater than the critical speed range. Each machine, of course, will have a particular critical speed range for its particular shaft so that when two machines are connected, in order that one may be driven by the other, the respective shafts will have respective critical speed ranges. When these ranges are different, as they usually are, it is desirable to regulate the speed of the driving machine so that neither shaft will be subjected to speeds that lie within its particular speed range. In a great many instances this is accomplished by operating one of the machines above its critical speed range, usually the smaller machine.

An object of the invention is to avoid prolonged operation of a rotary member at critical speeds.

Other objects will be in part obvious and in part pointed out hereinafter.

The accompanying drawing shows diagrammatically, in elevation and partly in section, rotary driving and driven machinery embodying protective apparatus constructed in accordance with the practice of the invention.

Referring more particularly to the drawing, a motor or engine, shown as a turbine, is enclosed in a casing 9 and is connected to actuate a rotary driving member or shaft 10 extending through the casing 9. The shaft 10 is connected to drive the rotary driven member, or shaft 10' of a rotary machine 11 which may be, for example, the centrifugal vapor compressor of a refrigerating system (not shown). Each shaft 10 and 10' has a particular critical speed range and care must be taken that neither machine operates for prolonged periods within its critical speed range.

The motor is supplied with pressure fluid, in the present instance steam, by way of a supply main 13 leading to the motor, and suitable governing mechanism 14 controlled by the motor serves constantly to control the flow of pressure fluid and, therefore, the speed of the motor.

The exhaust fluid from the motor is discharged through a conduit 15 and, in the case of steam, is conveyed to a condenser 12 into which the conduit opens. The condenser, as shown, is of the surface type provided with cooling tubes 16, suitable connections 17 for cooling water, and a vacuum pump 18 serving to produce low pressures at the motor outlet.

The governing device 14, preferably of a hydraulically actuated type, comprises a valve 20 interposed in the supply main 13 preferably on the down-stream side of a manually operable valve 19 also interposed in the main 13. The valve 20 is connected to be controlled in accordance with the speed of the motor by a pressure-responsive device 21 to which pressure fluid, such as oil, is conveyed by a pipe 22 from a positive displacement pump 23 driven by the rotary shaft 10 of the motor through suitable gearing 24.

Oil is supplied to the pump 23 from a reservoir 25 through a pipe 26, and from the pump discharge pipe 22 a branch pipe 27 leads back into the reservoir. The pipe 27 includes a suitable metering device 28, as for example a diaphragm having a small orifice therein, for controlling the pressure of the oil delivered to the device 21 and for determining the operating speed of the motor.

The pipe 22 will also be provided with a second branch pipe 29 leading back into the reservoir 25 and this pipe includes a suitable automatic safety valve 30. The pump 23 may also supply oil to the bearings (not shown) of the motor and the machine 11, if desired.

The pressure-responsive device 21 is shown in the form of a Sylphon to the free end of which a rod 31 is attached, and a compression spring 33 bears against a head 32 on the rod to oppose the action of the Sylphon. The valve 20 is shown as being of the rotary type having an external arm 34 connected to rotate the same, and this arm is slotted to receive a projection 35 on the rod 31 by means of which the valve may be actuated in accordance with the pressure of the oil delivered from the pump 23 to the Sylphon 21.

The parts so far described are of conventional types and serve to represent well known devices involving rotary driving and driven machines in which the speed of the prime mover is subject to considerable variation and with which suitable governing mechanism is employed to eliminate the greater part of such variation. However, under extreme operating conditions, the prime mover may fail to respond fully to the action of the governing mechanism and the speed of the machines may then vary to an extent that one of the machines may be brought into a critical range of speed and subjected to severe vibrational strain.

The present invention contemplates obviating the destructive action incurred by the vibration accompanying critical ranges of speed, and provides suitable automatic controlling devices for cutting off the flow of power medium to the prime mover when conditions arise tending to cause operation of a rotary member at its critical speed. In the form of the invention illustrated a butterfly valve 36 is interposed in the supply pipe 13 intermediate the governor valve 20 and the motor, and means are provided for holding the valve in open position while the rotary members operate at safe speeds and for quickly releasing and closing the valve should the speed of one of the rotary members approach a critical rate. To this end the valve 36 is provided with a lever 37 to which is connected one end of a tension spring 38 for moving the valve to closed position, and the other end of this spring is held in fixed position, as by connection to an arm 39 supported by the pipe 13.

A latch device 41 engageable with the lever 37 serves to hold the valve 36 in open position. This arrangement comprises a bar 40, which is preferably of a magnetic material, one end of which forms a finger 41 engageable with the lever 37, and the other end of which forms a handle 42. The bar 40 is fulcrumed at 43 intermediate its ends, and intermediate the fulcrum and the handle end of the bar is connected one end of a spring 44 which serves to disengage the finger 41 from the lever 37. The other end of this spring is also arranged in fixed position as by a connection to the pipe 13.

An electro-magnetic device 45 is provided for holding the arm 40 and finger 41 in latching arrangement with the lever 37 in opposition to the action of the spring 44. This device may be of any suitable construction and is shown as an electro-magnet controlled by an electrical circuit supplied with electricity by wires 46.

The electrical circuit comprises wires 47 and 48 which lead from the supply 46 to the electromagnet 45 and in these wires 47 and 48 is positioned a plurality of pressure-responsive switch devices for controlling the operation of the electro-magnetic device 45.

The wire 48 is provided with parallel branch circuits 49, 50 and 51 in each of which is positioned a switch, two of which act responsively to the pressure of the oil delivered by the pump 23 and the third of which is a manually controlled switch member 52, preferably of the push button type, for rendering these pressure-responsive switches ineffective when desired. The circuits 49, 50 and 51 are rejoined into the single wire 48 beyond the switches.

The pressure-responsive switch member 53 in the wire 50 is connected to be actuated to closed position by a Sylphon 54 and a compression spring 55 opposes the action of the Sylphon and serves to open the switch 53 at a certain decreasing speed of the motor.

A similar pressure-responsive switch 56 is shown in the wire 49 and is connected to be actuated toward open position by a Sylphon 57, and a compression spring 58 opposes the action of the Sylphon 57 and serves to move the switch 56 to closed position at a certain decreasing motor speed.

A pipe 59 branching from the pipe 22 leading from the pump 23 serves to convey the oil from the pump to pipes 60 and 61 leading to the Sylphons 57 and 54, respectively. One end of each of these Sylphons is in fixed position and the free ends carry rods 62 connected to the switch members 53 and 56, respectively, for actuating the same. Each of the rods 62 carries a head 63 against which one of the spring members 55 or 58 is in abutment, and suitable buttresses 64, which may be adjustable, if desired, serve to hold the spring members 55 and 58 under compression against the heads 63. The spring 55 is preferably under greater compression than the spring 58 in order that the switch 56 will open prior to the closing of switch 53 when the speed of the motor is accelerating.

Further protective devices are also disclosed, comprising two pressure-responsive switches 68 and 73 in the wire 47 in series with the switches 52, 53 and 56. The first of these switches at 68 comprises a Sylphon 65 to which is connected a pipe 66 communicating with the condenser 12 or with the discharge conduit 15 of the motor. The free end of the Sylphon is connected to a rod 67 carrying the switch 68, the Sylphon serving to move the switch toward closed position, and a tension spring 69 is connected to the rod 67 to actuate the switch 68 to open position.

The second pressure-responsive switch 73 comprises a Sylphon 70 connected by a pipe 71 to the supply main 13 preferably at a point intermediate the valves 19 and 20. A rod 72 is carried by the free end of the Sylphon and is connected to the switch 73 for moving the switch to closed position, and a compression spring 74 abuts against the switch and buttress 73', which may be adjustable if desired, and serves to act in opposition to the Sylphon 70 for opening the switch 73.

The operation of the apparatus is as follows: Before starting the motor the vacuum pump 18 will be started to create a vacuum in the condenser 12 and at the motor outlet and to effect closure of the switch 68.

The operator will then place the finger 41 in engagement with the lever 37 and manually hold the rod 40 latched to the lever and the valve 36 in open position. The governor valve 20 will be open due to lack of pressure in the Sylphon 21, and the valve 19 may now be partly opened to warm up the motor and to effect closure of the switch 73.

During the warming-up period, the speed of the motor and the pressure of the oil from the pump 23 will be sufficiently low to assure continuous closure of the switch 56 and a complete circuit will thus be established in the wires 47 and 48 to energize the electro-magnet 45 and hold the bar 40 in latching position and the valve 36 in open position.

After the motor has warmed up, the valve 19 may be fully opened and the speed of the motor accelerated to its normal rate. The governor 14 will then come into action to control the pressure fluid entering the motor and to maintain the speed of the motor substantially constant.

During acceleration, however, the speed of a rotary driving or driven member may pass through a critical range and effect operation of the switches 53 and 56. These switches act in response to the pressure of the oil delivered by the pump 23, and consequently in response to the speed of the shaft 10, to control the circuit to the electro-magnet 45 and the position of the valve 36. They may be set to act at any desired speed, and in the present instance, the switch 56 opens as the speed of the controlling rotary member increases and approaches a critical range, both switches are open during the critical range, and the switch 53 closes as the speed increases beyond the critical range. When both switches are open, the circuit to the electro-magnet 45 will be broken and, unless otherwise prevented, the valve 36 will close.

Hence, during acceleration of the motor speed from warm-up to a normal rate, the valve 36 will be held open manually either by holding the bar 40 latched to the valve lever 37, or by pressing the button switch 52 to maintain the circuit to the electro-magnet 45 irrespective of any action of the switches 53 and 56.

During normal operation, if the normal rate of speed is above the critical range of speed, the switch 53 will be closed and the valve 36 held in open position by the magnet 45. However, should the speed of the motor now decrease for any reason, such as by a sudden increase of the load on the motor, to a point approaching the critical speed range of a rotary member, the decreasing oil pressure from the pump 23 will cause the switch 53 to open, effect closure of the valve 36 and cut off of the flow of pressure fluid to the motor.

If the normal operating speed of the motor is below the critical range of speed of a controlling rotary member, the switch 56 will normally be closed to hold the valve 36 open. If the motor speed should increase, however, as by a sudden lightening of the load, increasing oil pressure from the pump 23 will cause the switch 56 to open and the valve 36 to be closed as the increasing speed approaches the critical range.

The switch 68 will serve to close the valve 36 at a certain increasing pressure in the discharge line 15 of the motor which might be caused, for example, by an interruption in the cooling water for the condenser 12 or by an interruption in the action of the vacuum pump 18.

The switch 73 acts to effect closure of the valve 36 at a certain low pressure in the supply main 13, and will also act to prevent continued operation of the motor if there is insufficient pressure in the main when starting the motor.

It will be apparent that, since the motor, the rotary shaft 10 and the rotary driven machine 11 are connected to move in unison, the pump 23 may be connected to be driven by any one of them and that the pressure-responsive switches 53 and 56 may act responsively to the speed of any one of the rotary parts. Thus, if any adverse condition arises in the motor or its associated parts such as may cause the speed of a rotary driving or driven member to operate for a prolonged period at a critical speed, the motor may be quickly and automatically shut down without attention from the operator, thereby immediately relieving the vibrational strain accompanying such critical speeds.

I claim:

1. In combination, rotary driving means, rotary driven means connected to be driven by the driving means, each rotary means being adapted to operate above and below its critical speed range, means to supply power medium to the range, means to supply power medium to the driving means, and means acting in response to the speed of the rotary means to cut off the supply of power medium to the driving means as the speed of one of the rotary means approaches its critical speed range both from a speed above and a speed below the critical speed range.

2. In combination, a motor including a rotary member adapted to operate above and below its critical speed range, means to supply power medium to the motor, and means acting in response to the speed of the motor to cut off the supply of power medium as the speed of the rotary member approaches said critical speed range both from a speed above and a speed below the critical speed range.

3. In combination, a motor, a rotary member driven by the motor adapted to rotate above and below a critical speed range, means to supply power medium to the motor, and means acting in response to the speed of the rotary member to cut off the supply of power medium to the motor as the speed of the rotary member approaches said critical speed range both from a speed above and a speed below the critical speed range.

4. In combination, rotary driving means, rotary driven means connected to be driven by the driving means, means to supply power medium to the driving means, and means acting in response to the speed of the rotary means to cut off the supply of power medium to the driving means as the speed of one of the rotary means decreases to a critical range.

5. In combination, rotary driving means, rotary driven means connected to be driven by the driving means adapted to rotate above and below a critical speed range, means to supply power medium to the driving means, and means acting in response to the speed of the rotary means to cut off the supply of power medium to the driving means as the speed of one of the rotary means increases to said critical speed range both from a speed above and a speed below the critical speed range.

6. In combination, rotary driving means, rotary driven means connected to be driven by the driving means, means to supply power medium to the driving means, and a plurality of devices acting in response to the speed of the rotary means, one device acting to cut off the supply of power medium to the driving means as the speed of one of the rotary means increases to a critical range, and another device acting to cut off the supply of power medium to the driving means as the speed of one of the rotary means decreases to a critical range.

7. In combination, rotary driving means, rotary driven means connected to be driven by the driving means adapted to rotate above and below a critical speed range, means to supply power medium to the driving means, pressure producing means actuated by the rotary means, and a pressure-responsive device controlled by the last-named means and acting to cut off the supply of power medium to the driving means as the speed of one of the rotary means approaches said critical range both from a speed above and a speed below the critical speed range.

8. In combination, rotary driving means, rotary driven means connected to be driven by the driving means, means to supply power medium to the driving means, pressure producing means actuated by one of the rotary means, and a plurality of pressure-responsive devices controlled by the last-named means, one device acting to cut off the supply of power medium to the driving means as the speed of one of the rotary means increases to a critical range, and another device acting to cut off the supply of power medium to the driving means as the speed of one of the rotary means decreases to a critical range.

9. In combination, rotary driving means, rotary driven means connected to be driven by the driving means, means to supply power medium to the driving means including a control member, a pumping member driven by one of the rotary means, a plurality of pressure-responsive devices controlled by the pumping member, electrical means controlled by said devices and acting to control the control member, one device acting to effect cut-off of the power medium for the driving means as the speed of one of the rotary means decreases to a critical range and another device acting to effect cut-off of the power medium for the driving means as the speed of the one of the rotary means increases to a critical range, and means associated with said electrical means whereby, when starting the rotary means, the supply of power medium to the driving means may be maintained irrespective of the action of said devices.

10. In combination, a pressure fluid actuated engine adapted to operate above and below a critical speed range, means to admit pressure fluid to the engine, means to discharge pressure fluid from the engine, means normally responsive to the speed of the engine to prevent admission of pressure fluid to the engine when the speed of said engine approaches said critical speed range both from a speed above and a speed below the critical speed range, and means responsive to a predetermined pressure of the discharge fluid to actuate the last said means to prevent admission of pressure fluid to the engine.

11. In combination, a pressure fluid actuated engine adapted to operate above and below a critical speed range, means to admit pressure fluid to the engine, means normally responsive to the speed of the engine to prevent admission of pressure fluid to the engine when the speed of said engine approaches said critical speed range, and means responsive to a predetermined pressure of the pressure fluid to actuate the last said means to prevent admission of pressure fluid to the engine.

12. In combination, the rotary driven means, a motor connected to drive the driven means at speeds above and below a critical speed range, means to supply pressure fluid to the motor, means normally acting in response to the speed of the rotary means to cut off the supply of pressure fluid to the motor when the motor approaches said critical speed range, and means responsive to a predetermined pressure of a pressure fluid to actuate the last said means to cut off the supply of pressure fluid to the motor.

13. In combination, rotary driven means, rotary driving means to drive the driven means at speeds above and below the critical speed range, means to supply pressure fluid to the motor, a pumping device actuated by one of said rotary driven means to maintain a second fluid under pressure, a pressure responsive device actuated by said second fluid to control the supply of pressure fluid to the motor for governing the speed thereof, pressure responsive means actuated by said second fluid to prevent admission of pressure fluid to the motor as the speed of the motor approaches said critical speed range, and means responsive to a predetermined pressure of the pressure fluid to cut off the supply of pressure fluid to the motor.

14. In combination, a rotary driven means, rotary driving means to drive the driven means at speeds above and below a critical speed range, means to supply pressure power fluid to the motor including a controlled member, means to discharge pressure fluid from the motor, a pumping device actuated by said rotary means, means including an electrical circuit to control the controlled member and a plurality of pressure responsive switch devices in said circuit adapted on opening to cause the controlled member to cut off the supply of pressure power fluid to the motor, one switch device adapted to open when the pressure of the pressure power fluid reaches a predetermined value, another switch device adapted to open when the discharge pressure fluid reaches a predetermined value, and other switch devices controlled by the pumping device adapted to open when the speed of the rotary means approaches the critical speed range.

GEORGE H. WOODARD.